United States Patent
Allebach et al.

(10) Patent No.: US 8,961,912 B2
(45) Date of Patent: Feb. 24, 2015

(54) METHODS FOR REDUCING THE ACIDIC GAS CONTENT OF EFFLUENT GASES

(75) Inventors: William S. Allebach, St. Genevieve, MO (US); Gerald K. Bequette, St. Genevieve, MO (US); Randy J. Griffard, St. Mary, MO (US)

(73) Assignee: Mississippi Lime Company, St. Louis, MO (US)

( * ) Notice: Subject to any disclaimer, the term of this patent is extended or adjusted under 35 U.S.C. 154(b) by 986 days.

(21) Appl. No.: 13/073,622

(22) Filed: Mar. 28, 2011

(65) Prior Publication Data

US 2012/0251423 A1 Oct. 4, 2012

(51) Int. Cl.
*B01D 53/40* (2006.01)
*B01D 53/81* (2006.01)
*B01D 53/83* (2006.01)
*B01D 53/50* (2006.01)
*B01D 53/68* (2006.01)

(52) U.S. Cl.
CPC ............. *B01D 53/40* (2013.01); *B01D 53/504* (2013.01); *Y02C 20/30* (2013.01); *B01D 2251/404* (2013.01); *B01D 2257/2045* (2013.01); *B01D 2257/2047* (2013.01); *B01D 2257/302* (2013.01); *B01D 2258/0283* (2013.01); *B01D 2259/126* (2013.01)
USPC ................. 423/210; 423/244.01; 423/244.07; 423/240 R

(58) Field of Classification Search
None
See application file for complete search history.

(56) References Cited

U.S. PATENT DOCUMENTS

| | | | | |
|---|---|---|---|---|
| 4,083,932 A | * | 4/1978 | Muraco et al. | 423/210 |
| 5,641,124 A | * | 6/1997 | Bringfors | 239/290 |
| 5,678,959 A | | 10/1997 | Griffard et al. | |
| 6,200,543 B1 | | 3/2001 | Allebach et al. | |
| 6,451,281 B1 | | 9/2002 | Ebeling et al. | |
| 6,939,523 B2 | * | 9/2005 | D'Alesandro | 423/243.08 |
| 2008/0210096 A1 | * | 9/2008 | Crews et al. | 96/243 |
| 2008/0213708 A1 | | 9/2008 | Cristea et al. | |

OTHER PUBLICATIONS

Notes Relating to Testing of the Delivery of Hydrated Lime into Flue Gas Exhaust by use of a Shrouded Lance Performed by Mississippi Lime Co., Apr. 6, 2009, p. 11 (See "Apr. 6, 2009 Testing").

Larry Wolfe et al., Lime Injection Technology—A Viable Tool for the Electric Arc Furnace, Paper; 10 pages (Available to public on or before Aug. 27, 2011 as per applicant's Jun. 10, 2014 remarks).

Shin-Min Shih, et al., Kinetics of the Reaction of Ca(OH)2 with CO2 at Low Temperatures, Ind. Eng. Chem. Res., 1999, vol. 38, pp. 1316-1322.

M. Bausach et al., Kinetic Modeling of the Reaction between Hydrated Lime and SO2 at Low Temperatures, AIChE Journal, Mar. 28, 2005, pp. 1455-1466 vol. 51, No. 5.

(Continued)

*Primary Examiner* — Stuart Hendrickson
*Assistant Examiner* — Daniel Berns
(74) *Attorney, Agent, or Firm* — Armstrong Teasdale LLP

(57) ABSTRACT

Methods for reducing the acidic gas content of effluent gas streams are disclosed. The methods generally involve reducing the acidic gas content of combustion gases passing through a duct by injecting hydrated lime or pulverized quicklime into the duct by use of a shrouded injector which reduces the incidence of occlusion of the injector.

26 Claims, 8 Drawing Sheets

(56) References Cited

OTHER PUBLICATIONS

Chiung-Fang Liu et al., Kinetics of the Reaction of Hydrated Lime with SO2 at Low Temperatures: Effects of the PResence of CO2, 02, and NOx, Ind. Eng. Chem. Res., 2008, vol. 47, pp. 9878-9881, Published on Web.

Curt Biehn et al., Long Term Pre-Air Preheater injection of Hydrated Lime and Potential Co-benefits, Presentation, 2009, pp. 37.

H. W. Hopkins et al., Predicting PAC, Hydrated Lime, and Trona Injection Effectiveness in Flue Gas Systems Using CFD and Physical Flow Analyses for Optimized Nozzle Design, Technical Paper BR-1838, Jun. 2010, pp. 8.

Larry D. Wolfe, et al., Overview of Lime Injection in the Electric Arc Furnace, Technical Paper, 15 pages (available at http://www.carmeusena.com/files/files/TechPapersReports/tr_lime_inj_eaf_2007.pdf prior to Mar. 28, 2011).

Ben D'Alessio, Dry Hydrated Lime Injection for Coal-Fired Boiler Flue Gas Desulfurization (FGD), Sorb-N-Ject Technology, 10 pages (available at http://www.nol-tec.com/articles/NT_FGD_0209.pdf prior to Mar. 28, 2011).

* cited by examiner

METHODS FOR REDUCING THE ACIDIC GAS CONTENT OF EFFLUENT GASES

FIELD

The field of the disclosure relates to methods for reducing the acidic gas content of effluent gas streams and, in particular, to methods for reducing the acidic gas content of combustion gases passing through a duct by injecting hydrated lime or pulverized quicklime into the exhaust duct. The methods generally include use of a shrouded injector which reduces the incidence of occlusion of the injector.

BACKGROUND

Many industrial processes involve a combustion operation which results in formation of an effluent gas containing one or more by-product acidic compounds. Reducing the acidic gas content of the effluent gas prior to discharging the gas to the ambient air will reduce air pollution. In particular, reducing the $SO_2$, $SO_3$ and $H_2SO_4$ content of such effluent gases as these compounds can reduce unsightly gas plumes, reduce corrosive by-products, and reduce the risk of harmful human exposure. These problems may be particularly acute in coal-fired power plants which produce significant amounts of $SO_2$ and/or $SO_3$. Other industrial processes also involve formation of gaseous effluents that contain acidic gases including, for example, waste incinerators, sulfuric acid plants, non-coal fired power plants (e.g., oil), large-scale diesel generators, boilers, brick and ceramic furnaces, and lime and cement kilns.

Various flue gas desulfurization ("FGD") processes have been developed to reduce the amount of acidic gases in the effluent gas and, in particular, to reduce the amount of $SO_2$, $SO_3$ and/or $H_2SO_4$. One such method involves introducing a dry alkaline sorbent such as hydrated lime ($Ca(OH)_2$) or pulverized quicklime ($CaO$) into the exhaust duct through which the flue gas passes to react the sorbent with the acid compound to form a particulate solid (e.g., $CaSO_3$ or $CaSO_4$) which may be removed in a downstream ash collection system. Such methods and, in particular, methods which involve use of hydrated lime, may result in occlusion of processing equipment such as the outlet end of injectors (synonymously "lances") which distribute hydrated lime into the exhaust duct. Occlusion of one or more injectors significantly reduces the effectiveness of the FGD system and requires that the system by intermittently shut-down to free the occlusion from the injectors.

A continuing need exists for methods for reducing the acidic gas content of effluent gases (e.g., flue gases produced from coal-fired power plants) which involve use of hydrated lime and/or pulverized quicklime and which reduce or even eliminate occlusion problems associated with such methods.

SUMMARY

One aspect of the present disclosure is directed to a method for reducing the acidic gas content of an effluent gas passing through a duct, the duct having a wall. In accordance with the method, hydrated lime or pulverized quicklime is introduced into a shrouded injector. The injector includes an inner tube that forms an inner passage and an outer tube shrouding the inner tube. The inner tube and outer tube form an annular passage between the inner tube and outer tube. The hydrated lime or pulverized quicklime is introduced into the inner passage of the inner tube. The injector also includes an outlet end. Ambient air is introduced into (1) the annular passage formed between the inner tube and the outer tube or (2) the inner passage formed by the inner tube. The hydrated lime or pulverized quicklime is discharged from the outlet end of the injector into the duct to react the hydrated lime or pulverized quicklime with acidic gas thereby reducing the concentration of acidic gas in the effluent gas. The ambient air is discharged from the outlet end of the injector to inhibit occlusion of the outlet end.

Another aspect of the present disclosure is also directed to a method for reducing the acidic gas content of an effluent gas passing through a duct, the duct having a wall. In accordance with the method, hydrated lime or pulverized quicklime is introduced into a shrouded injector. The injector includes an inner tube that forms an inner passage and an outer tube shrouding the inner tube. The inner tube and outer tube form an annular passage between the inner tube and outer tube. The hydrated lime or pulverized quicklime is introduced into the inner passage of the inner tube. The injector also includes an outlet end. Moistened air is introduced into the annular passage formed between the inner tube and the outer tube. Hydrated lime or pulverized quicklime is discharged from the outlet end into the duct to react hydrated lime or pulverized quicklime with acidic gas thereby reducing the concentration of acidic gas in the effluent gas.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

Corresponding reference characters indicate corresponding parts throughout the drawings.

DETAILED DESCRIPTION

Figure 1:
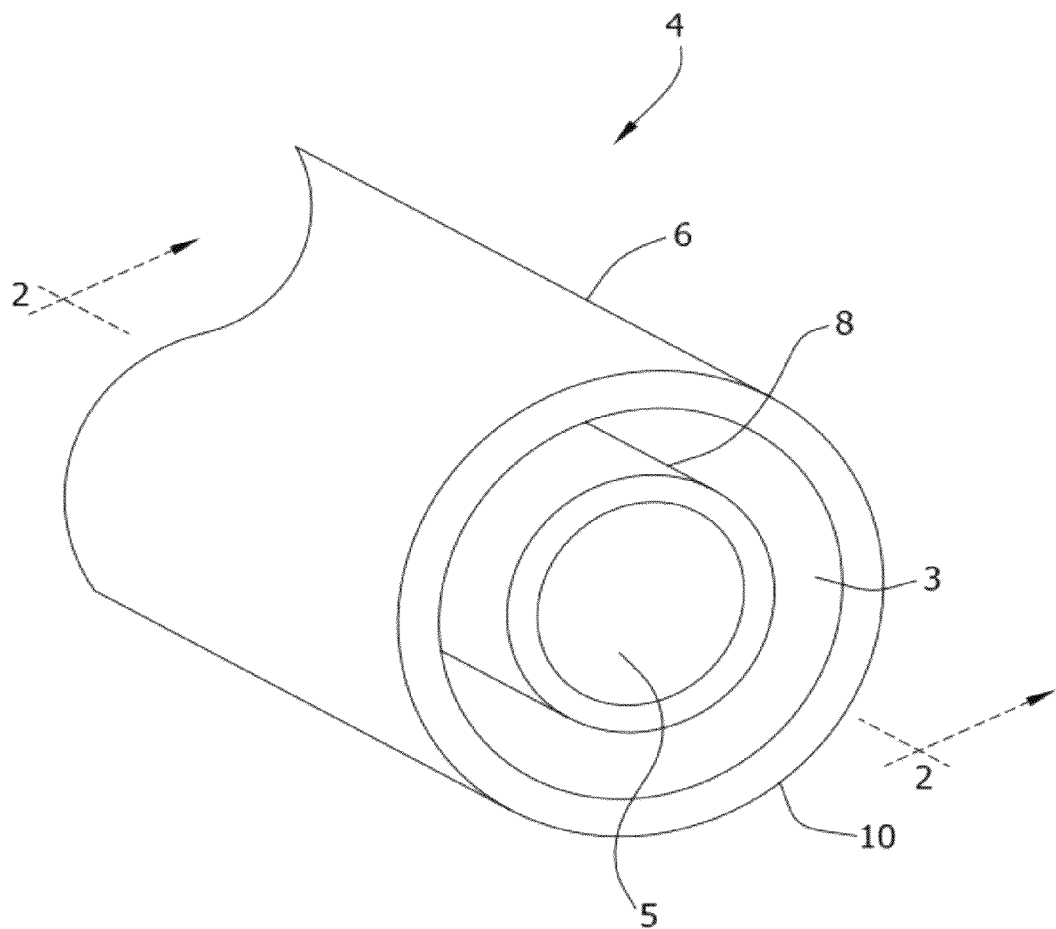
FIG. 1 is a perspective view of an injector for discharging hydrated lime or pulverized quicklime into an exhaust duct.

Referring now to FIG. 1, a shrouded injector 4 for use in accordance with the present disclosure is shown. The injector 4 includes an inner tube 8 that forms an inner passage 5. Hydrated lime or pulverized quicklime is pneumatically conveyed through the inner passage 5 of the inner tube 8 to discharge the lime into an exhaust duct as more fully described below. The injector 4 also includes an outer tube 6 that shrouds the inner tube 8. Generally the outer tube 6 is concentric to the inner tube 8. However, the present disclosure also includes embodiments wherein the outer tube 6 and inner tube 8 are not concentric along a portion of their length (e.g., at their outlet) or even are not concentric along their entire respective lengths. The inner tube 8 and outer tube 6 form an annular passage 3 between the inner tube and outer tube. A shrouding gas is introduced into the annular passage 3 to prevent the injector from occluding.

Figure 2:
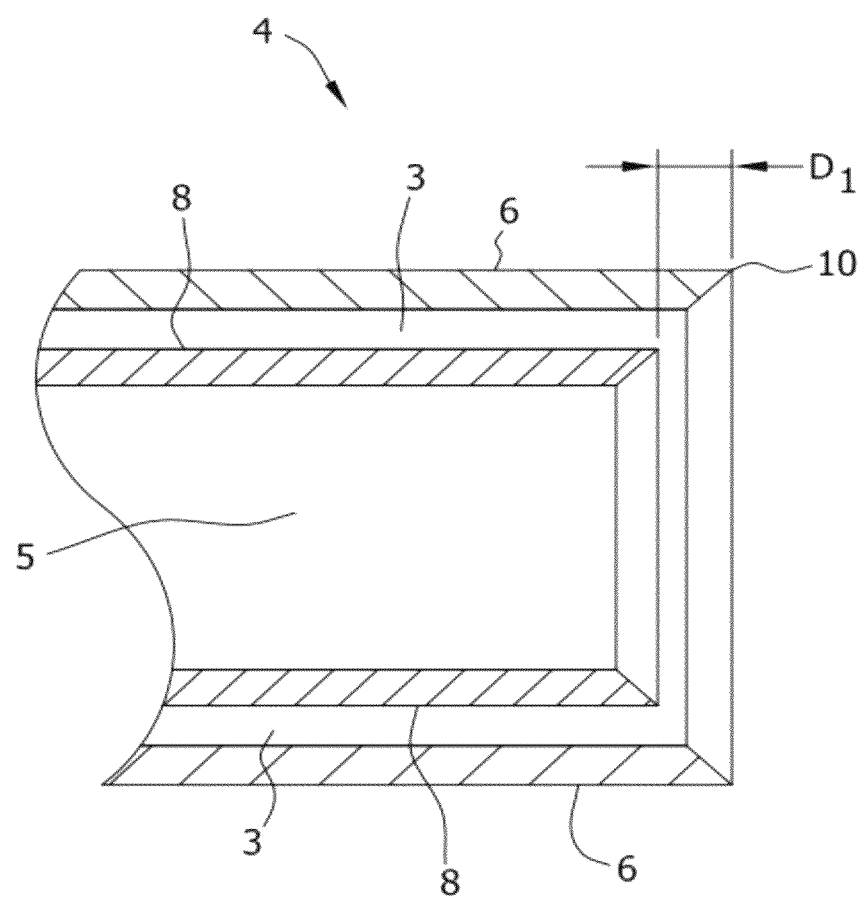
FIG. 2 is a cross-section view of the injector taken along line 2-2 of FIG. 1.

The injector 4 has an outlet end 10 which, as shown in FIG. 2, corresponds to the outlet end of the outer tube 6 and not that of the inner tube 8 as the outer tube 6 extends past the inner tube 8. It should be noted however that, in some embodiments, the inner tube 8 and outer tube 6 terminate at the same point and the outer end 10 of the injector 4 corresponds to the outlet end of both the inner tube and outer tube. As shown in FIG. 2, the outer tube 6 extends past the inner tube 8 by a distance $D_1$. This offset $D_1$ helps ensure that the shrouding air completely purges the outlet end 10 of the injector 4, thereby preventing reaction between lime (the hydrate) and acidic gas as lime is introduced into the effluent gas. $D_1$ should be sufficiently small such that the shrouding gas prevents lime (e.g., hydrated lime) from contacting the effluent gas as lime exits the injector 4 and may depend on the velocity of the shrouding and conveying gases. In several embodiments, the offset distance $D_1$ is at least about 0.125 inches (about 0.318 cm) or even about 0.25 inches (about 0.635 cm) or more (e.g., from about 0.125 inches to about 2 inches (about 0.318 cm to about 5.080 cm) or from about 0.125 inches to about 1 inch (about 0.318 cm to about 2.540 cm)). As stated above, $D_1$ may be zero and the inner tube 8 and outer tube 6 may terminate at the same point. As shown in FIG. 2, the outlet end of the inner tube 8 and outlet end of the outer tube 6 may be beveled to reduce the metal surface area upon which scale may begin to form at the outlet 10. The bevel also creates a venturi effect as lime exits the injector 4 to help distribute lime into the exhaust duct. In some embodiments, the inner tube 8 and/or outer tube 6 narrow at their respective outlet ends to increase the velocity of the shrouding gas and/or conveying gas prior to their discharge into the exhaust duct to facilitate their distribution into the exhaust duct.

In some embodiments of the present disclosure, the ratio of the diameter of the inner tube 8 to the diameter of the outer tube 6 is at least about 1:4. Higher ratios such as at least about 1:3, at least about 2:3, at least about 3:4 or at least about 4:5 may be used so as to reduce the amount of shrouding gas. Suitably the ratio of the diameter of the inner tube 8 to the diameter of the outer tube 6 may be less than about 9:10, less than about 7:8, less than about 3:4 or less than about 2:3. The diameter of the outer tube 6 may be from about 1.5 inches to about 4 inches (about 3.81 cm to about 10.16 cm) and the diameter of the inner tube 8 may be from about 1.25 inches to about 3 inches (about 3.18 cm to about 7.62 cm). Tube diameters listed above are exemplary and other tube diameters may be used without limitation.

Figure 3:
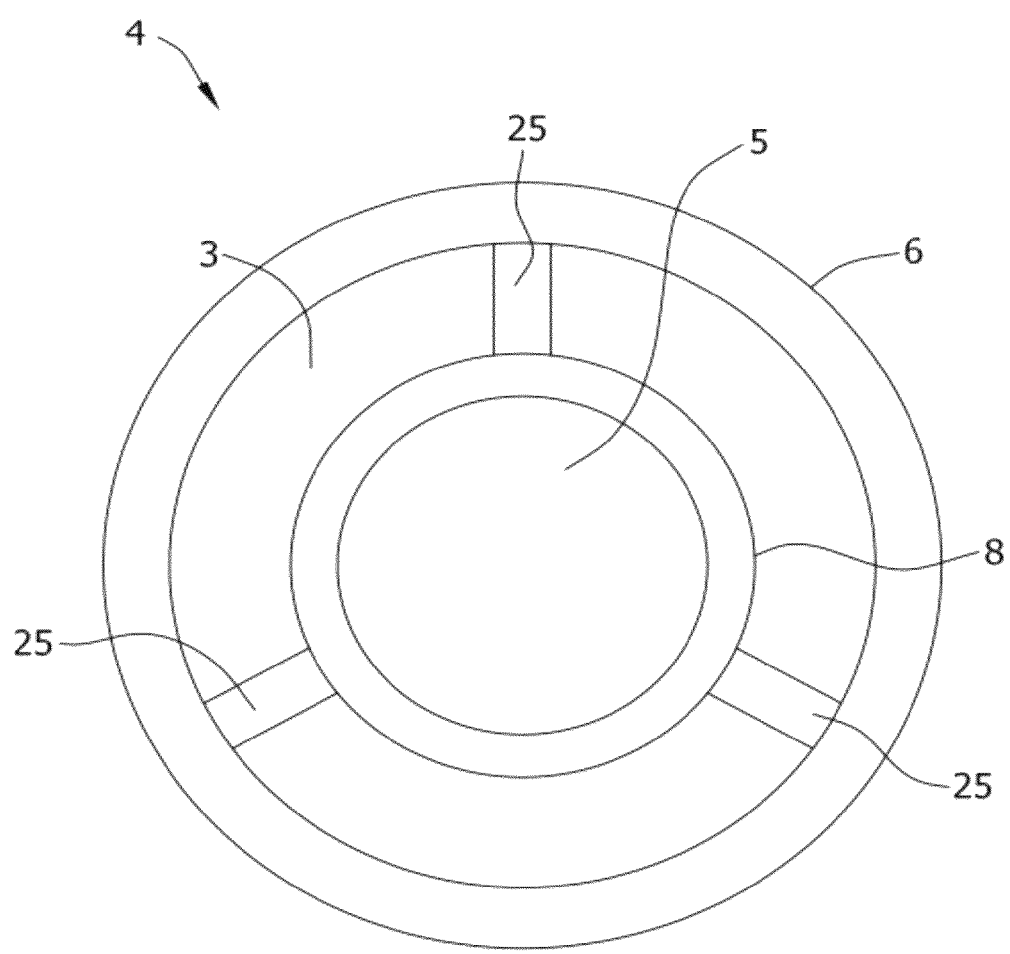
FIG. 3 is a front view of the injector.

Referring now to FIG. 3, the inner tube 8 may be generally centered within the outer tube 6 by use of three or more spacers 25 that are attached (e.g., by welding) to the inner tube 8 and center the outer tube 6 (e.g., by welding the spacers 25 to the inner tube 8 and not the outer tube 6). The spacers 25 may run the length of the injector 4 or may be used intermittently along the length without limitation.

Figure 4:
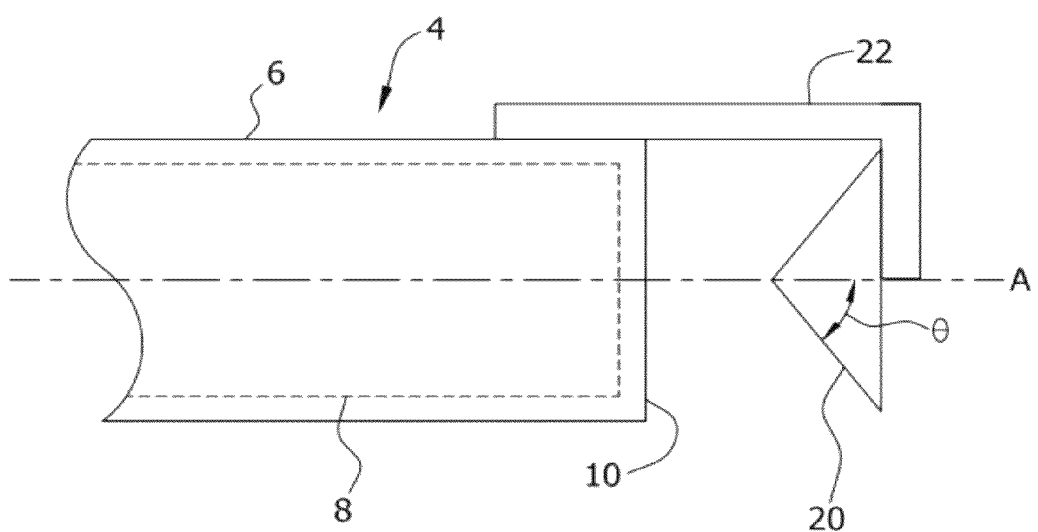
FIG. 4 is a side view of the injector and a dispersion cone of another embodiment.

In some embodiments of the present disclosure and as shown in FIG. 4, a dispersion cone 20 is attached to the injector 4 to help distribute lime into the exhaust duct. The dispersion cone 20 may be attached by a bracket 22 which is attached (e.g., by welding) to the injector 4. The injector 4 includes an imaginary axis A that extends through the cone 20. The cone 20 forms an angle θ with the imaginary axis A. Angle θ may suitably be from about 30° to about 60°. In this regard it has been found that by shrouding the inner tube 8 (FIG. 1) of the injector 4, less scale is formed between the outlet end 10 of the injector 4 and the cone 20 relative to conventional injectors.

The materials of construction for the injector 4 and dispersion cone 20 should generally be resistant to corrosion in the environment in which they are used and, in particular, should be resistant to corrosion when exposed to acidic gases. Suitable materials of construction include any material (e.g., metals) that can reliably withstand the temperatures and pressures used within the injector 4 such as carbon steel, stainless steel or brass.

Figure 5:
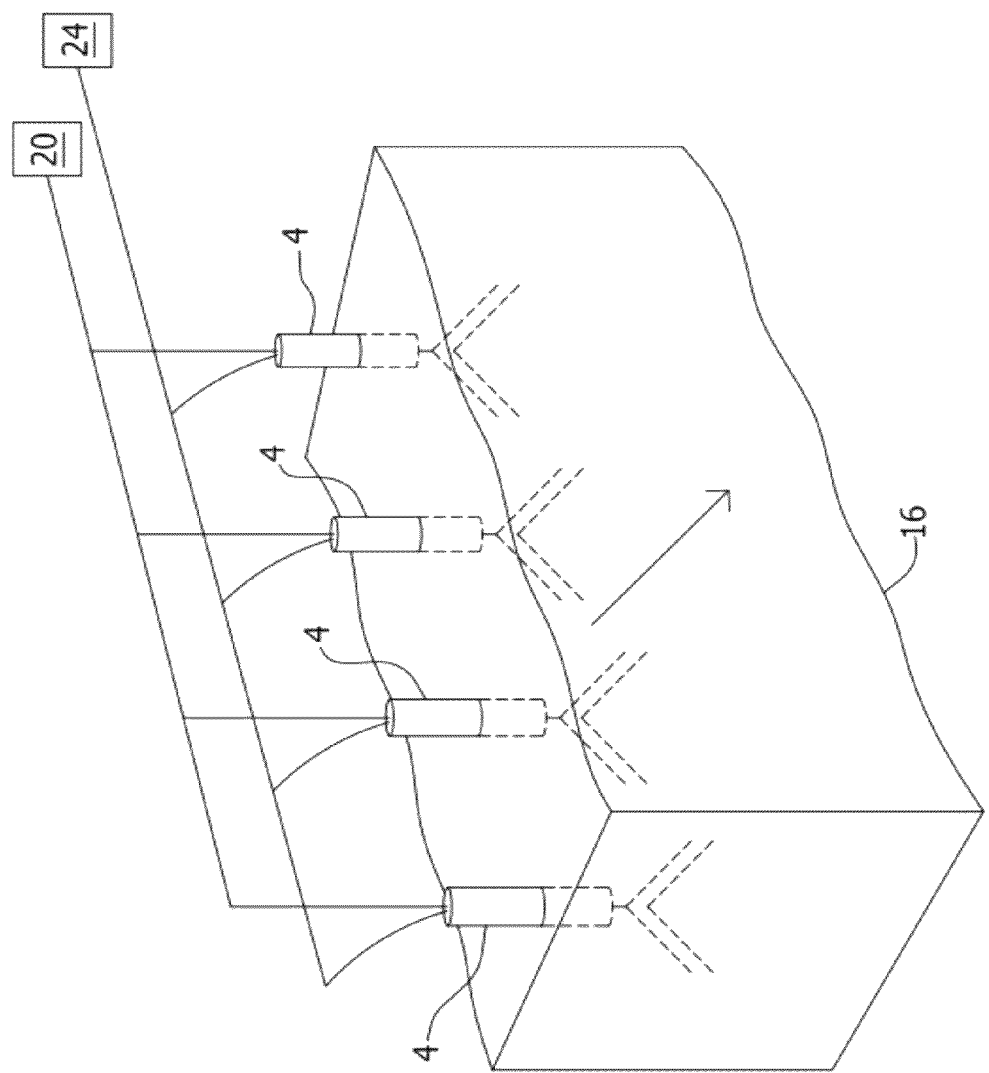
FIG. 5 is a schematic view of a series of injectors arranged in an exhaust duct with the exhaust duct being transparent for clarity.

Referring now to FIG. 5, a plurality of injectors 4 and, optionally, dispersion cones (not shown), may be used in a system for introducing lime sorbent into a duct 16 in which effluent gas passes, with the direction of effluent gas being indicated by the arrow. The injectors 4 may be arranged in parallel as shown in FIG. 5. The injectors 4 may extend through a common wall as shown in FIG. 5 or, alternatively, the injectors may be arranged at spaced intervals along the exhaust duct circumference. The injectors 4 may also be arranged in configurations other than as shown or described (e.g., in series) without limitation.

Each injector 4 is in fluid communication with a shrouding gas 24 and a conveying gas 20, the conveying gas having sorbent entrained therein. The conveying gas 20 is introduced into the inner passage 5 of the inner tube 8 (FIG. 1) of each injector 4 to disperse the sorbent into the exhaust duct 16. The shrouding gas 24 is introduced into the annular passage 3 formed between the inner tube 8 and outer tube 6 (FIG. 1) to shroud the sorbent as it enters the exhaust duct 16. In this regard, the inner tube 8 of the injector 4 may form part of and be integral with the pneumatic conveying system (e.g., conveying lines) used to transfer sorbent (e.g., lime). In conventional injection systems in which a shrouded injector is not used and, in particular, in which the sorbent is hydrated lime, as the hydrated lime is discharged from the outlet end of the injector, the injector forms scale deposits as it contacts certain gaseous compounds (e.g., $SO_3$, $CO_2$ or HCl) at the outlet end (e.g., forms calcium sulfate, calcium chloride and/or calcium carbonate deposits). In accordance with the present disclosure, use of shrouded gas prevents the sorbent from contacting the effluent gas as the sorbent exits the outlet end of the injector, thereby preventing scale from forming on the injector outlet.

In one or more embodiments of the present disclosure, the shrouding gas 24 is ambient air. As used herein, "ambient air" is air drawn from the atmosphere and has not had the composition thereof altered (e.g., reduction in $CO_2$ so as to produce a "conditioned" ambient). In this regard, ambient air that is introduced into the injector 4 may have the pressure and/or temperature thereof altered without departing from the scope of the present disclosure. As shown in Example 1 below, it has been found that use of ambient air as a shrouding gas results in reduction or even elimination of scale deposits at the outlet of the injector despite ambient air containing a substantial amount of $CO_2$. Additionally or alternatively, ambient air may be used as a conveying gas to transfer sorbent (e.g., hydrated lime) from its source to the exhaust duct through which the effluent gas to be treated passes.

If the exhaust duct 16 in which the injectors 4 are placed has a positive pressure, the ambient air used for shrouding is pressurized (e.g., by a blower or compressor) prior to being introduced into the injectors. However, if the exhaust duct operates under negative pressure, the ambient shrouding air may be drawn in directly from the ambient with use of a throttling valve to control the ambient shrouding air flow rate.

As an alternative to using ambient air as a shrouding gas, moistened air may be used. As used herein, "moistened air" is air to which water or water vapor has been added to increase the moisture content of the air above ambient conditions. In this regard, the amount of moisture in the moistened air after water (which then vaporizes) or water vapor is added is at least about 20 mg per g of air. In other embodiments, the amount of moisture in the moistened air is at least about 30 mg per g of air or, as in other embodiments, at least about 50 mg per g of air, at least about 100 mg per g of air, at least about 150 mg per g of air, at least about 200 mg per g of air, from about 20 to about 250 mg per g of air, from about 50 to about 250 mg per g of air or from about 100 to about 250 mg per g of air. The moistened air may also be conditioned prior to use by reducing the amount of $CO_2$ therein below ambient conditions (e.g., to below about 330 ppm by volume).

By using moistened air, the relative humidity within the exhaust duct 16 may be increased. An increase in relative humidity has been found to favor removal of acidic gases as shown by, for example, Liu et al. in "Kinetics of the Reaction of Hydrated Lime with $SO_2$ at Low Temperatures: Effects of the Presence of $CO_2$, $O_2$, and $NO_x$," Industrial and Engineering Chemistry Research, vol. 47, pp. 9878-81 (2008), Bausach et al. in "Kinetic Modeling of the Reaction between Hydrated Lime and $SO_2$ at Low Temperature," AICHE Journal, Vol. 51:5, pp. 1455-66 (2005) and "Kinetics of the Reaction of $Ca(OH)_2$ with $CO_2$ at Low Temperature," Industrial and Engineering Chemistry Research, vol. 38, pp. 1316-22 (1999), each of which is incorporated herein by reference for all relevant and consistent purposes.

In embodiments wherein moistened air is used as a shrouding gas, the conveying gas used to pneumatically convey the sorbent may be ambient air or conditioned air (e.g., low $CO_2$ air). Conditioned air may be produced according to any method available to those of skill in the art and may be produced, for example, by the methods disclosed in U.S. Pat. No. 6,200,543, which is incorporated herein by reference for all relevant and consistent purposes.

The flow rate of the shrouding gas should generally be sufficiently high to prevent lime (e.g., hydrated lime or pulverized quicklime) from contacting the effluent gas as the lime exits the injector so at prevent occlusion of the injector outlet. In several embodiments of the present disclosure, the ratio of the velocity of the shrouding gas to the velocity of the conveying gas is at least about 1:6 and, in other embodiments may be at least about 1:4, at least about 1:2, at least about 1:1 or even at least about 2:1 (e.g., from about 1:6 to about 3:1 or from about 1:6 to about 1:1). In these and other embodiments, the flow velocity of the shrouding gas may range from about 2,500 ft/min to about 10,000 ft/min (about 762 meters/min to about 3,048 meters/min) and the flow velocity of the conveying gas may range from about 3,000 ft/min to about 15,000 ft/min (914 meters/min to about 4,572 meters/min). In this regard, the recited ratios and velocities are exemplary and the ratios and velocities chosen for use may depend on a number of system parameters (e.g., exhaust gas pressure, lime flow rate, duct sizing and the like). Ratios and velocities other than as recited may be sued without limitation.

The flow rates of the shrouding gas and the amount of lime introduced into the exhaust duct (and the amount of conveying gas which is used to transfer lime) may vary depending on a number of system factors including, for example, throughput of the exhaust gas to be treated, the concentration of the acidic gases therein, the target acidic gas concentration of the treated gas, sorbent residence time and the like. A typical loading rate is at least about 2 moles calcium per mole of acid gas to be treated or, as in other embodiments, at least about 4 moles of calcium per mole of acid gas to be treated or at least about 6 moles or even at least about 10 moles of calcium per mole of acid gas to be treated (e.g., from about 2 moles to about 15 moles of calcium per mole of acid gas to be treated). When $SO_3$ is targeted for removal from the effluent gas, the weight ratio of calcium to $SO_3$ may be from about 2:1 to about 10:1. In this regard, the loading rates described above are exemplary and the loading rate may depend on a number of system factors (e.g., residence time, injection array efficiency and/or particle collection device efficiency). Loading rates may be adjusted by measuring $SO_3$ content at a test point (e.g., at the stack) and adjusting the loading ratio to achieve a desired $SO_3$ concentration at the test point.

The number of injectors 4 used to supply sorbent (e.g., hydrated lime) into the exhaust duct (FIG. 5) may vary depending on the size of the gas duct. The number should be selected to allow lime to sufficiently contact all acidic gas in the duct to thereby neutralize the acidic gas. In addition to the size of the duct, the number of injectors used may depend on the flue gas temperature, acidic gas content and residence time.

The pressure of the shrouding gas introduced into the annular passage 3 of the injector 4 and the pressure of the conveying gas introduced into the inner passage 5 formed by the inner tube 8 should be selected to be greater than the pressure of the effluent gas in the exhaust duct to assure adequate flow rates of lime (e.g., hydrated lime) and shrouding gas. The temperature of the shrouding gas and/or conveying gas are generally above ambient as these gases are pressurized prior to use. The temperature should be maintained above the dew point of the respective gas to prevent condensation from occurring in the annular passage 3 or the inner passage 5 of the injector 4.

Generally lime that is introduced into the inner passage 5 of the inner tube 8 (FIG. 1) is either hydrated lime ($Ca(OH)_2$) or pulverized quicklime (CaO). In some embodiments, a mixture of hydrated lime and pulverized quicklime may be used to reduce the acidic gas content of the effluent gas. Suitable sources of hydrated lime and/or quicklime include all sources available to those of skill in the art. Hydrated lime may be produced on site (i.e., at the general location of the exhaust gas to be treated) by reacting water with lime (CaO) or may be obtained from commercial suppliers (e.g., MISSISSIPPI LIME COMPANY® (St. Louis, Mo.)). The hydrated lime may have a surface area of at least about 14 $m^2/g$, at least about 17 $m^2/g$ or even at least about 21 $m^2/g$ (e.g., from about 14 $m^2/g$ to about 28 $m^2/g$). Generally, at least about 92 wt % or at least about 95 wt % (e.g., from about 92 wt % to about 99 wt %) of the hydrated lime will be $Ca(OH)_2$ compounds. The hydrated lime may have a particle size distribution such that at least about 85%, at least about 92% or at least about 95% of the particles have an average nominal diameter of less than about 0.044 mm (corresponding to mesh sieve size of 325). The hydrated lime may be relatively porous (e.g., from about 0.07 $cm^3/g$ to about 0.14 $cm^3/g$) and may be relatively dry (e.g., less than about 3 wt % moisture or less than about 1 wt % moisture). In this regard, it should be noted that the listed parameters (e.g., surface area, purity, particles sizes, moisture content and the like) are exemplary and hydrated lime parameters other than as listed may be used without limitation.

In embodiments wherein quicklime is used, the quicklime is generally pulverized prior to use (either before shipping or at the site at which the exhaust gas is treated). Pulverized quicklime may also be obtained commercially (e.g., from MISSISSIPPI LIME COMPANY® (St. Louis, Mo.)).

Lime may be stored in a bulk lime storage silo and may be transferred into a pneumatic conveying line by a variable rotary airlock. In embodiments wherein more than one injector is used, the pneumatic conveying line may be divided into one or more feeder lines by use of one or more line splitters. Each feeder line is in fluid communication with a respective injector 4. Shrouding air may also be introduced into the injector by use of a main conveying line and several feeder lines. Generally a portion of the injector 4 extends through the exhaust duct wall. The distance to which the injector 4 extends in the duct should be selected such that lime becomes well distributed in the duct and may vary depending on a number of system factors including the size of the duct, the respective effluent gas and lime flow rates and whether a dispersion cone is used.

The effluent gas which is treated to reduce the acidic gas content thereof may be formed in any number of industrial processes. The effluent gas may be a gas produced in operation of, for example, a waste incinerator, a sulfuric acid plant, a non-coal fired power plant (e.g., oil), a large-scale diesel generator, a boiler, a furnace (brick or ceramic) or a kiln (lime or cement). The injector is particularly well suited for treating flue gas produced during coal-fired power generation. In coal-fired power plants, the exhaust duct to which the hydrated lime and/or pulverized quicklime is introduced may be the boiler exhaust duct, ducts downstream of any catalytic processes (e.g., selective catalytic reduction), the pre-heater exhaust duct or ducts that are upstream of an electrostatic precipitator. The hydrated lime and/or pulverized quicklime may alternatively be added at other process points. As used herein, the phrases "exhaust duct" and "effluent gas" should not be limited to any particular process or to any particular process point. Further, the term "duct" should not be limited to any particular duct shape or to any particular type of conveying apparatus. In some embodiments, lime (e.g., hydrated lime) may be added to one or more unit operations directly or to the discharge portions of the unit operations themselves (e.g., air pre-heater). In general, the term "exhaust duct" should not be considered in a limiting sense.

The effluent gas that is treated may include any number of acidic compounds such as, for example $SO_2$, $SO_3$, $H_2SO_4$, HCl, and/or HF. Further the concentration of these gases before treatment may be from about 600 ppm to about 3000 ppm. The majority of the acidic gas present may be $SO_2$ (e.g., from about 600 ppm to about 3000 ppm $SO_2$) and each of the remaining gases may be present (if at all) at a concentration within the range of about 1 ppm to about 200 ppm. It should be noted that concentrations other than as listed may be used without limitation. In this regard, conventional injectors have been found to more likely occlude when increased amounts of $CO_2$ are present in the effluent gas due to scale (e.g., $CaCO_3$) that forms upon contact with $CO_2$. The injector of the present disclosure may suitably be used to treat flue gases containing at least about 10 vol % $CO_2$, at least about 15 vol % $CO_2$ or even at least 20% $CO_2$ without occlusion. The temperature of the effluent gas may be from about 250° F. to about 800° F. (about 121° C. to about 427° C.).

EXAMPLES

Example 1

Comparison of Scale Formation when a Shrouded Injector and a Non-Shrouded Injector are Used to Introduce Hydrated Lime into an Exhaust Duct Five injectors (i.e., "lances") were installed on the exhaust duct of a rotary lime kiln to determine the effectiveness of a shrouded injector. Two injectors were shrouded with an outer pipe and about 50 ft$^3$/min (1416 liters/min) of ambient air was used as a shrouding gas. Two other injectors were not shrouded and were composed of a single tube. The fifth injector was shrouded and used conditioned air as the shrouding gas. The flow rate of hydrated lime was 100 lbs/hr (45.4 kg/hr) and the flow rate of conveying gas was about 75 ft$^3$/min (2124 liters/min) per injector.

The effluent gas that was treated was at a temperature of about 500° F. (260° C.), contained 20 vol % $CO_2$ and was loaded with about 7.5 tons per hour of dust. Each injector was inspected after about 364 hours of use. Photographs of the outlet ends of the two non-shrouded injectors are shown in FIGS. 6 and 7, and a typical photograph of the outlet end of the shrouded injectors is shown in FIG. 8.

Figure 6:
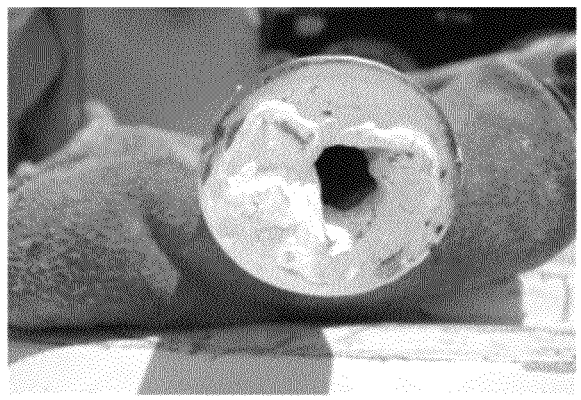
FIGS. 6 and 7 are photographs of an occluded injector operated in accordance with Example 1.
Figure 7:
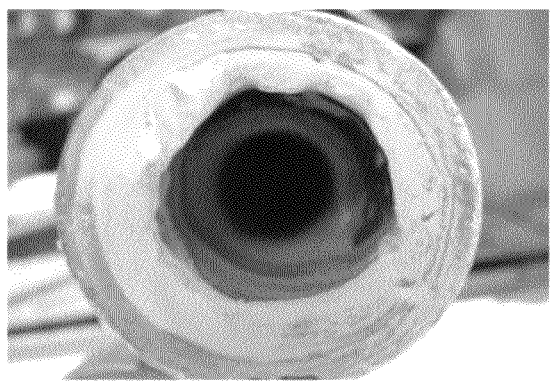
Figure 8:
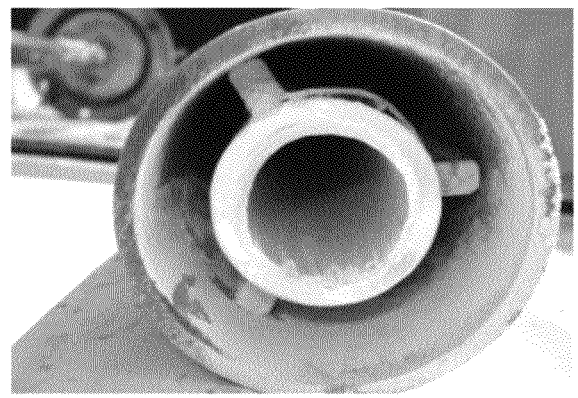
FIG. 8 is a photograph of a shrouded injector operated in accordance with Example 2.

As can be seen from FIGS. 6-8, the shrouded injectors did not form an occlusion and both non-shrouded injectors were substantially plugged after use.

When introducing elements of the present disclosure or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above apparatus and methods without departing from the scope of the disclosure, it is intended that all matter contained in the above description and shown in the accompanying figures shall be interpreted as illustrative and not in a limiting sense.

What is claimed is:

1. A method for reducing the acidic gas content of an effluent gas passing through a duct, the duct having a wall, the method comprising:
    introducing hydrated lime or pulverized quicklime into a shrouded injector, the injector comprising:
        an inner tube that forms an inner passage;
        an outer tube shrouding the inner tube, the inner tube and outer tube forming an annular passage between the inner tube and outer tube, the hydrated lime or pulverized quicklime being introduced into the inner passage of the inner tube; and
        an outlet end;
    introducing ambient air into the annular passage formed between the inner tube and the outer tube;
    introducing conditioned air into the inner passage formed by the inner tube;
    discharging the hydrated lime or pulverized quicklime from the outlet end of the injector into the duct to react the hydrated lime or pulverized quicklime with acidic gas thereby reducing the concentration of acidic gas in the effluent gas, the ambient air being discharged from the outlet end of the injector to inhibit occlusion of the outlet end.

2. The method as set forth in claim 1 wherein the hydrated lime or pulverized quicklime discharged from the outlet end of the injector is directed towards a distribution cone to disperse hydrated lime or pulverized quicklime into the duct.

3. The method as set forth in claim 1 wherein hydrated lime is introduced into the inner passage of the inner tube.

4. The method as set forth in claim 1 wherein the acidic gas is selected from the group consisting of $SO_2$, $SO_3$, $H_2SO_4$, HCl, and HF.

5. The method as set forth in claim 1 wherein the effluent gas comprises $SO_3$.

6. The method as set forth in claim 1 wherein the injector comprises two or more spacers attached to the inner tube to center the inner tube in the outer tube.

7. The method as set forth in claim 6 wherein the annular passage partitioned into a plurality of sections by the spacers.

8. A method for reducing the acidic gas content of an effluent gas passing through a duct, the duct having a wall, the method comprising:
introducing hydrated lime or pulverized quicklime into a shrouded injector, the injector comprising:
an inner tube that forms an inner passage;
an outer tube shrouding the inner tube, the inner tube and outer tube forming an annular passage between the inner tube and outer tube, the hydrated lime or pulverized quicklime being introduced into the inner passage of the inner tube; and
an outlet end;
introducing ambient air into (1) the annular passage formed between the inner tube and the outer tube and (2) the inner passage formed by the inner tube;
discharging the hydrated lime or pulverized quicklime from the outlet end of the injector into the duct to react the hydrated lime or pulverized quicklime with acidic gas thereby reducing the concentration of acidic gas in the effluent gas, the ambient air being discharged from the outlet end of the injector to inhibit occlusion of the outlet end.

9. The method as set forth in claim 8 wherein the hydrated lime or pulverized quicklime discharged from the outlet end of the injector is directed towards a distribution cone to disperse hydrated lime or pulverized quicklime into the duct.

10. The method as set forth in claim 8 wherein hydrated lime is introduced into the inner passage of the inner tube.

11. The method as set forth in claim 8 wherein the acidic gas is selected from the group consisting of $SO_2$, $SO_3$, $H_2SO_4$, HCl, and HF.

12. The method as set forth in claim 8 wherein the effluent gas comprises $SO_3$.

13. The method as set forth in claim 8 wherein the injector comprises two or more spacers attached to the inner tube to center the inner tube in the outer tube.

14. The method as set forth in claim 13 wherein the annular passage is partitioned into a plurality of sections by the spacers.

15. A method for reducing the acidic gas content of an effluent gas passing through a duct, the duct having a wall, the method comprising:
introducing hydrated lime or pulverized quicklime into a shrouded injector, the injector comprising:
an inner tube that forms an inner passage;
an outer tube shrouding the inner tube, the inner tube and outer tube forming an annular passage between the inner tube and outer tube, the hydrated lime or pulverized quicklime being introduced into the inner passage of the inner tube, wherein the inner tube and outer tube both extend through the wall into the duct, the outer tube extending further into the duct than the inner tube to shroud the hydrated lime or pulverized quicklime as it is discharged from the inner passage of the inner tube; and
an outlet end;
introducing ambient air into (1) the annular passage formed between the inner tube and the outer tube or (2) the inner passage formed by the inner tube;
discharging the hydrated lime or pulverized quicklime from the outlet end of the injector into the duct to react the hydrated lime or pulverized quicklime with acidic gas thereby reducing the concentration of acidic gas in the effluent gas, the ambient air being discharged from the outlet end of the injector to inhibit occlusion of the outlet end.

16. The method as set forth in claim 15 wherein the ambient air is introduced into the annular passage formed between the inner tube and outer tube.

17. The method as set forth in claim 16 wherein conditioned air is introduced into the inner passage formed by the inner tube.

18. The method as set forth in claim 15 wherein the ambient air is introduced into the inner passage formed by the inner tube.

19. The method as set forth in claim 18 wherein conditioned air is introduced into the annular passage formed between the inner tube and outer tube.

20. The method as set forth in claim 18 wherein moistened air is introduced into the annular passage formed between the inner tube and outer tube.

21. The method as set forth in claim 20 wherein the moistened air has a moisture content of at least about 20 mg per g of air.

22. The method as set forth in claim 16 wherein ambient air is introduced into the inner passage formed by the inner tube.

23. The method as set forth in claim 15 wherein the hydrated lime or pulverized quicklime discharged from the outlet end of the injector is directed towards a distribution cone to disperse hydrated lime or pulverized quicklime into the duct.

24. The method as set forth in claim 15 wherein hydrated lime is introduced into the inner passage of the inner tube.

25. The method as set forth in claim 15 wherein the acidic gas is selected from the group consisting of $SO_2$, $SO_3$, $H_2SO_4$, HCl, and HF.

26. The method as set forth in claim 15 wherein the effluent gas comprises $SO_3$.

* * * * *